United States Patent
Hwang et al.

(10) Patent No.: US 11,414,061 B2
(45) Date of Patent: Aug. 16, 2022

(54) VARIABLE TYPE FLEX BRAKE SYSTEM

(71) Applicants: HYUNDAI MOTOR COMPANY, Seoul (KR); KIA MOTORS CORPORATION, Seoul (KR)

(72) Inventors: Se-Ra Hwang, Suwon-si (KR); Gwan-Hyeong Cha, Seoul (KR); Gab-Bae Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 356 days.

(21) Appl. No.: 16/815,395

(22) Filed: Mar. 11, 2020

(65) Prior Publication Data
US 2021/0139009 A1 May 13, 2021

(30) Foreign Application Priority Data
Nov. 11, 2019 (KR) .................. 10-2019-0143416

(51) Int. Cl.
*B60T 13/74* (2006.01)
*B60T 8/32* (2006.01)
(Continued)

(52) U.S. Cl.
CPC ......... *B60T 8/3255* (2013.01); *B60W 10/188* (2013.01); *B60W 30/025* (2013.01); *B60W 50/085* (2013.01); *B60W 60/0025* (2020.02)

(58) Field of Classification Search
CPC ............ B60T 8/3255; B60T 2201/022; B60T 2270/14; B60T 7/22; B60T 13/662; B60T 2270/82; B60T 8/34; B60T 7/042; B60T 13/12; B60T 2220/04; B60W 10/188; B60W 30/025; B60W 50/085;
(Continued)

(56) References Cited

U.S. PATENT DOCUMENTS

2016/0185327 A1* 6/2016 Ishida ............. B60W 30/18172
701/74
2018/0134291 A1* 5/2018 Burford ................. B60K 31/00
(Continued)

FOREIGN PATENT DOCUMENTS

KR 10-2018-0094590 A 8/2018

*Primary Examiner* — Masud Ahmed
(74) *Attorney, Agent, or Firm* — Lempia Summerfield Katz LLC

(57) ABSTRACT

A variable type flex brake system includes: a driving control unit that receives interior or exterior information of a vehicle, provides an autonomous driving control mode or a normal driving control mode, calculates a required braking force in the autonomous driving and normal driving control modes, and generates a braking force signal corresponding to the required braking force; a first selection unit selecting a braking slope corresponding to a speed belonging to any one of low-speed, medium-speed, and high-speed sections to generate a first braking map; a second selection unit selecting a braking slope corresponding to a speed belonging to remaining speed sections that are not selected in the first selection unit, to generate a second braking map; and a braking control unit generating a braking-hydraulic-pressure signal based on the first or second braking map in response to the required braking force signal.

14 Claims, 12 Drawing Sheets

(51) Int. Cl.
*B60W 30/02* (2012.01)
*B60W 10/188* (2012.01)
*B60W 50/08* (2020.01)
*B60W 60/00* (2020.01)

(58) Field of Classification Search
CPC .. B60W 60/0025; B60W 10/18; B60W 30/14; B60W 40/105; B60W 2050/0026; B60W 2520/10; G05D 1/0061; B60Y 2300/14; B60Y 2400/81
See application file for complete search history.

(56) References Cited

U.S. PATENT DOCUMENTS

| | | | |
|---|---|---|---|
| 2018/0134292 A1* | 5/2018 | Alpman | B60T 8/00 |
| 2018/0215369 A1* | 8/2018 | Tsukamoto | B60T 13/745 |
| 2019/0291728 A1* | 9/2019 | Shalev-Shwartz | B60W 10/06 |
| 2020/0066159 A1* | 2/2020 | Chase | B60Q 5/006 |
| 2020/0276964 A1* | 9/2020 | Goto | B60T 13/04 |

\* cited by examiner

VARIABLE TYPE FLEX BRAKE SYSTEM

CROSS-REFERENCE TO RELATED APPLICATION

This application claims priority to and the benefit of Korean Patent Application No. 10-2019-0143416, filed on Nov. 11, 2019, the entire contents of which are incorporated herein by reference.

FIELD

The present disclosure relates to a variable type flex brake system.

BACKGROUND

The statements in this section merely provide background information related to the present disclosure and may not constitute prior art.

Generally, brake boosters are devices that boost pedal effort when a driver steps on a brake pedal to brake a vehicle, and may be classified into a vacuum booster, a hydraulic booster, and an electric booster.

Among them, a braking device using the electric booster drives a motor according to a pedal stroke sensor value that is information about a driver's pedal effort, thus generating braking pressure for front and rear wheels, and implements a cooperative control between the front wheel and the rear wheel. That is, the braking device using the electric booster generates braking pressure on a rear wheel side by the forward movement of a piston of a master cylinder on the rear wheel side according to a pedal stroke if a driver steps on a pedal, and simultaneously an ECU drives the motor of the electric booster on the basis of a calculated required braking force according to the pedal stroke, and the movement of the piston of the master cylinder on a front wheel side by the rotation of the motor generates braking pressure on the front wheel side.

The related art discloses a method for controlling an original of a motor of the electric booster to generate accurate braking pressure. This is intended to generate original braking hydraulic pressure according to a brake specification.

However, we have discovered that the related art uniformly controls an increase in braking hydraulic pressure without considering the initial braking speed at all, and we have found that it is desired to control the braking hydraulic pressure in consideration of the initial braking speed. In other words, if the initial braking speed section is in a low speed section, it is desired to slowly increase the braking hydraulic pressure so as to offer a comfortable braking sense. Meanwhile, if the initial braking speed section is in a high speed section, it is desired to rapidly increase the braking hydraulic pressure so as to achieve a fast responsiveness.

SUMMARY

The present disclosure provides a novel structure which allows a driver to select a braking map according to an initial braking speed, and can improve the balancing of a braking sense by adjusting a braking sense or a deceleration sense for each speed section.

According to one aspect of the present disclosure, a variable type flex brake system includes: a driving control unit configured to: receive interior information or exterior information of a vehicle, provide an autonomous driving control mode and a normal driving control mode, calculate a required braking force required for the vehicle in the autonomous driving control mode and the normal driving control mode, and generate a required braking force signal corresponding to the required braking force; a first selection unit configured to select a braking slope corresponding to a speed belonging to any one of a low-speed section, a medium-speed section, and a high-speed section, which are speed sections divided based on an initial braking speed of the vehicle, and configured to generate a first braking map; a second selection unit configured to select a braking slope corresponding to a speed belonging to remaining speed sections, among the low-speed section, the medium-speed section and the high-speed section, that are not selected by the first selection unit, and configured to generate a second braking map; and a braking control unit configured to generate a braking-hydraulic-pressure signal based on the first braking map or the second braking map in response to the required braking force signal.

According to the present disclosure, a driver can select various braking maps divided by initial braking speed sections, thus reducing or minimizing a different braking sense that may be felt by a driver or a passenger.

Furthermore, according to the present disclosure, even if a driver does not select a braking map in a first selection unit or a second selection unit, it is possible to set a braking map that is preset for each initial braking speed section.

In addition, according to the present disclosure, a braking slope is changed from a time when specificity occurs by reflecting information about a change in driving situation in the case of an active flex brake mode, thus providing a comfortable deceleration sense to a driver or a passenger.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
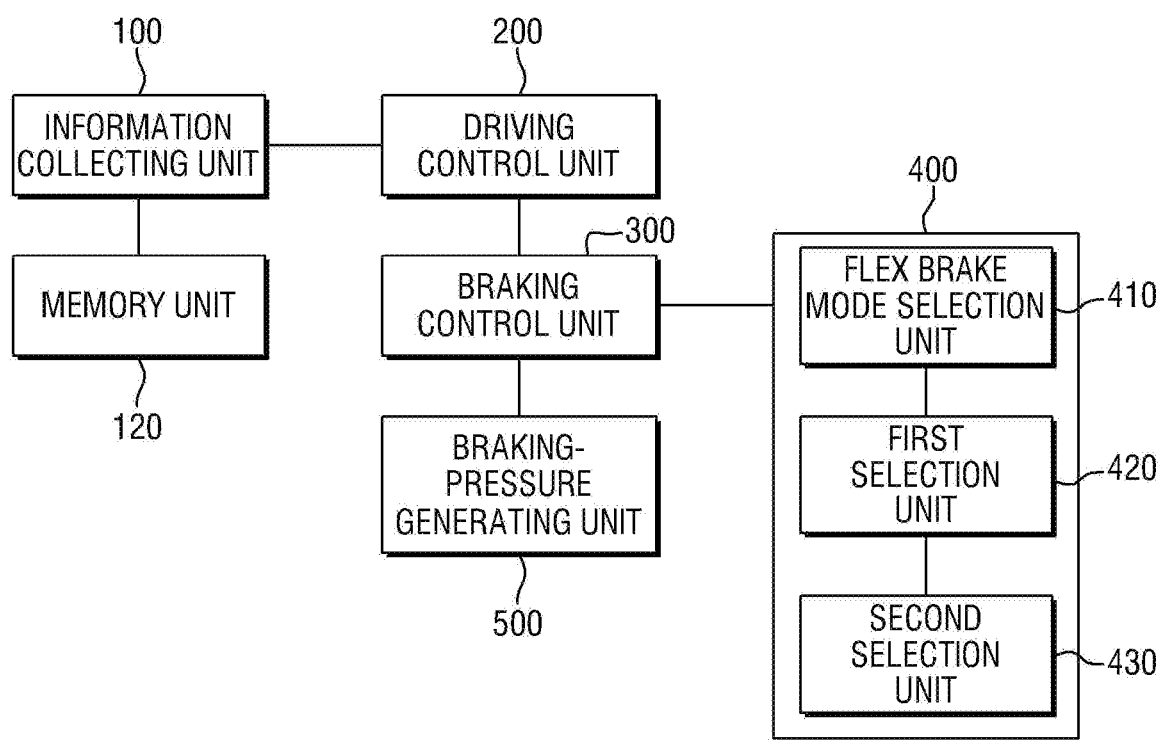
FIG. 1 is a diagram illustrating a schematic configuration of a variable type flex brake system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of a variable type flex brake system according to the present disclosure will be described in detail with reference to the accompanying drawings. The terms or words used in the description and claims should not be interpreted as being limited to common and dictionary meanings. On the contrary, they should be interpreted based on the meanings and concepts of the present disclosure in keeping with the scope of the present disclosure on the basis of the principle that the inventor(s) can appropriately define the terms in order to describe the present disclosure in the best way.

A variable type flex brake system according to one form of the present disclosure may be classified into a passive flex brake system and an active flex brake system according to a method of setting a braking map. The passive flex brake system or the active flex brake system may be applied to a vehicle. However, in one form of the present disclosure, the brake system may be switched into the passive flex brake system or the active flex brake system depending on a selected mode.

FIG. 1 is a diagram illustrating a schematic configuration of a variable type flex brake system according to one form of the present disclosure.

As illustrated in FIG. 1, the variable type flex brake system includes: an information collecting unit 100, a driving control unit 200, a braking control unit 300, a selection unit 400, and a braking-pressure generating unit 500. As used herein, the terms "unit", and "module" may be implemented as software or hardware (e.g., a processor), and a plurality of units, or modules may be integrated into one element or one unit. In other form, a module, or a block may include a plurality of elements in accordance with embodiments.

The information collecting unit 100 collects interior information of the vehicle and exterior information of the vehicle in real time. Here, the interior information of the vehicle includes information measured by various sensors installed in the vehicle, for example, a wheel speed sensor, a yaw rate sensor, a steering angle sensor, a pedal stroke sensor desired in a driver mode, and a sensor recognizing a driver as well as a passenger. Furthermore, the exterior information of the vehicle includes, for example, information measured by a RADAR, a LIDAR, an image sensor, a GPS, a navigation, a G sensor, an IOT module or the like to recognize an obstacle on a road on which a vehicle is driving, traffic information (ITS: International Transport Systems), or lanes or to check the driving path of adjacent vehicles.

The information collected in the information collecting unit 100 is stored in the memory unit 120. The memory unit 120 may include various storage media such as a flash memory, a hard disk, a Secure Digital (SD) card, a Random Access Memory (RAM), a Read Only Memory (ROM), a web storage or the like.

The driving control unit 200 controls the overall operation of the vehicle. The driving control unit 200 may provide an autonomous driving control mode having an autonomous driving function, and a normal driving control mode in which the vehicle is directly driven by a driver. In the autonomous driving control mode, even if a driver does not control a brake, a steering wheel, an accelerating pedal or the like, a driving path, driving conditions or the like are autonomously determined by recognizing a peripheral environment with the function of sensing and processing the interior and exterior information collected in the information collecting unit 100.

The driving control unit 200 calculates a required braking force required by the vehicle during braking and generates a required braking force signal corresponding to the required braking force. In the case of the autonomous driving control mode, the required braking force signal is a required deceleration signal calculated by the driving control unit 200. In the case of the normal driving control mode, the required braking force signal is a pedal effort signal received by the driving control unit 200 through the pedal stroke sensor depending on strength where a driver steps on the pedal.

The braking control unit 300 receives the required braking force signal of the driving control unit 200, and generates a braking-hydraulic-pressure signal according to the stored braking map. The braking control unit 300 provides the braking map to the selection unit 400 that will be described later, and the braking map selected in the selection unit 400 is stored in the memory unit 120.

The braking map defines the generating pattern of the braking hydraulic pressure, which may be shown by a graph or the like. According to one form of the present disclosure, a time axis (x axis) and a braking hydraulic pressure axis (y axis) are shown in the braking map, in which a braking slope shows a braking hydraulic pressure value as the function of time. However, in another form of the present disclosure, the graph of another pattern instead of the braking slope may be shown in the braking map.

Meanwhile, in the normal driving control mode, the time axis shown in the braking map may be represented by the amount of the pedal stroke. For example, in the normal driving control mode, the time axis of the braking map may represent the pedal stroke of 0% when a driver does not step on the pedal, and may represent the pedal stroke of 100% when the driver completely steps on the pedal. The amount of the pedal stroke and the time corresponding thereto may be exchanged with each other and then shown in the braking map.

The selection unit 400 includes a flex-brake-mode selection unit 410, a first selection unit 420, and a second selection unit 430. The driver may select a function provided by the selection unit 400 before driving the vehicle. The selection unit 400 may be installed in the vehicle while having various configurations such as an Audio Video Navigation (AVN), a separate display screen, a switch, or a dial, and interlocked with another terminal such as a smart phone.

The flex-brake-mode selection unit 410 has the passive flex brake mode or the active flex brake mode. The passive flex brake mode is a mode where the braking map having low-speed, medium-speed and high-speed braking slopes divided by the initial braking speed can be directly set by a driver, and the active flex brake mode is a mode that is equal in braking-map generating process to the passive flex brake mode but considers the occurrence of a specific situation during driving.

The first selection unit 420 provides an environment where a driver may select a braking slope corresponding to a speed belonging to any one of low-speed, medium-speed and high-speed sections divided according to an initial braking speed. At least one of the low-speed, medium-speed and high-speed sections may be displayed on the braking map illustrated in the first selection unit 420 so that the driver may select the section. Here, respective speed sections are divided according to the range of braking hydraulic pressure. If the driver selects the braking slope according to the speed, the first braking map is generated, and the first braking map is stored in the memory unit 120.

Hereinafter, the braking slopes in respective speed sections are referred to as the low-speed braking slope, the medium-speed braking slope, and the high-speed braking slope.

The driver may select the braking slope by designating an end point that is a braking hydraulic pressure value at a designated time tp in the braking map displayed on the first selection unit 420. That is, the braking slope is a slope connecting a braking hydraulic pressure value at an initial braking time t0 with a braking hydraulic pressure value at a designated time tp.

Here, the designated time tp is set in consideration of various factors including vehicle's design conditions, a driver's habit and the like. For example, in the normal driving control mode, if any driver tends not to completely step on the pedal during braking, the designated time tp may be a 70% pedal stroke or a time corresponding thereto.

In one form of the present disclosure, the driver designates the end point by touching his or her finger on the display screen of the first selection unit 420. However, the driver may designate the end point in various ways according to the configuration of the first selection unit 420. Hereinafter, the end point of the low-speed braking slope is denoted by L, the end point of the medium-speed braking slope is denoted by M, and the end point of the high-speed braking slope is denoted by H.

Figure 2:
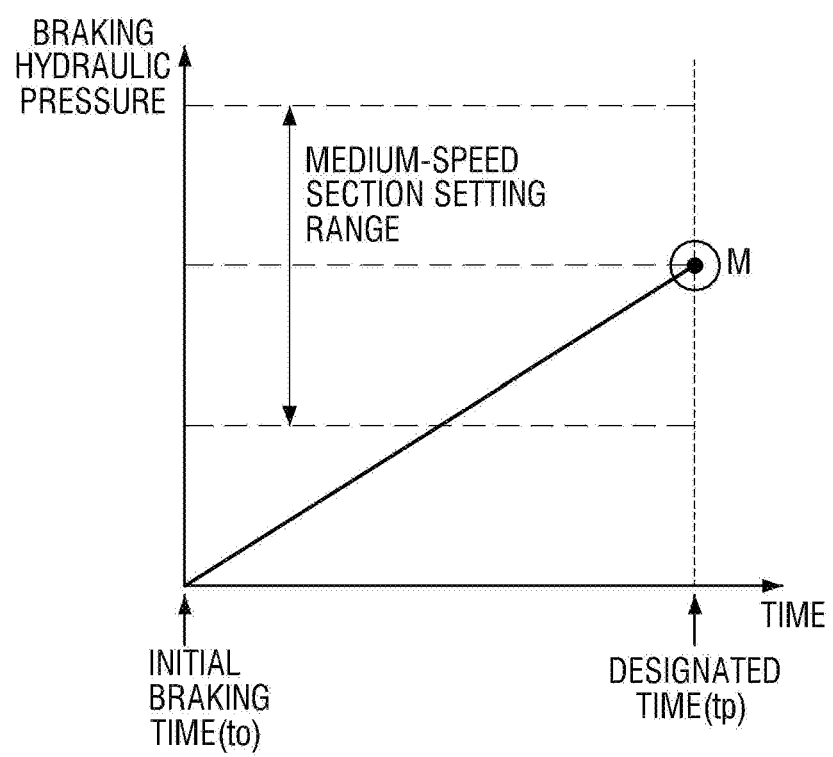
FIG. 2 is a diagram illustrating a first braking map where a medium-speed braking slope is selected in a passive flex brake system according to one form of the present disclosure.
Figure 3:
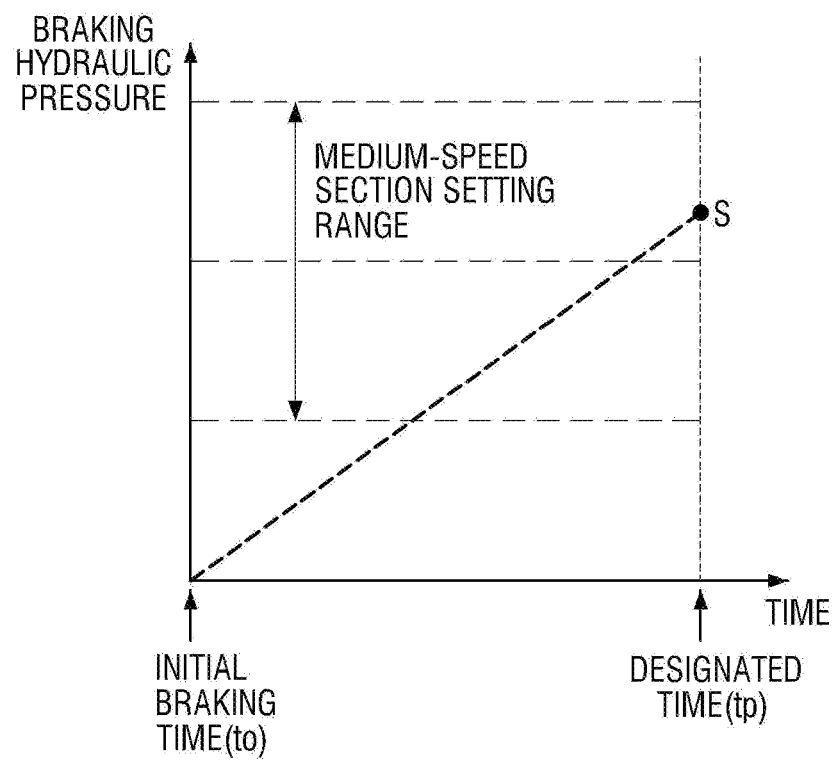
FIG. 3 is a diagram illustrating a first braking map where no braking slope is selected in the passive flex brake system according to one form of the present disclosure.

FIG. 2 is a diagram illustrating the first braking map where the medium-speed braking slope is selected in the passive flex brake system according to one form of the present disclosure, and FIG. 3 is a diagram illustrating the first braking map where no braking slope is selected in the passive flex brake system according to one form of the present disclosure.

Referring to FIG. 2, the braking map shown in the first selection unit 420 illustrates the range of the medium speed section having the highest braking frequency. If the driver designates the end point in the medium speed section shown in the braking map as M, the medium-speed braking slope is selected, and the first braking map is generated. Of course, the driver designates the end point in the low speed section shown in the braking map as L or designates the end point in the high speed section shown in the braking map as H, so that the first braking map having the low-speed braking slope or the high-speed braking slope may be generated.

Unless the driver designates the end point in the first selection unit 420, the braking control unit 300 sets the end point in the medium speed section as S. Here, S that is the end point is a value that is preset according to the vehicle's design conditions. The braking slope setting the end point as S is referred to as a reference braking slope. If the first braking map having the reference braking slope is generated, it is stored in the memory unit 120. FIG. 3 illustrates the first braking map having the reference braking slope.

The second selection unit 430 provides an environment where a driver may select a braking slope corresponding to a speed belonging to remaining speed sections other than the speed selected in the first selection unit 420. The braking map shown in the second selection unit 430 shows a braking slope that is selected or set in the first braking map in conjunction with the first braking map. If the driver selects a new braking slope or the new braking slope is set by the braking control unit 300, the second braking map is generated, and the second braking map is stored in the memory unit 120. Meanwhile, the braking map shown in the second selection unit 430 may display remaining speed sections other than the speed selected or set in the first selection unit 420.

Figure 4:
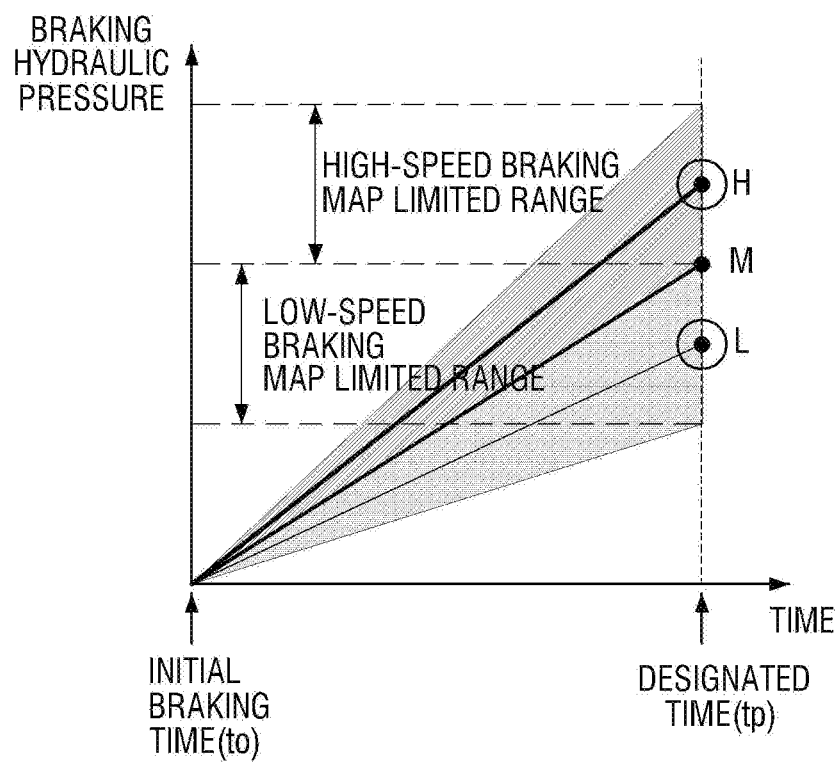
FIG. 4 is a diagram illustrating a second braking map where a low-speed braking slope and a high-speed braking slope are selected in conjunction with the first braking map of FIG. 2.
Figure 5:
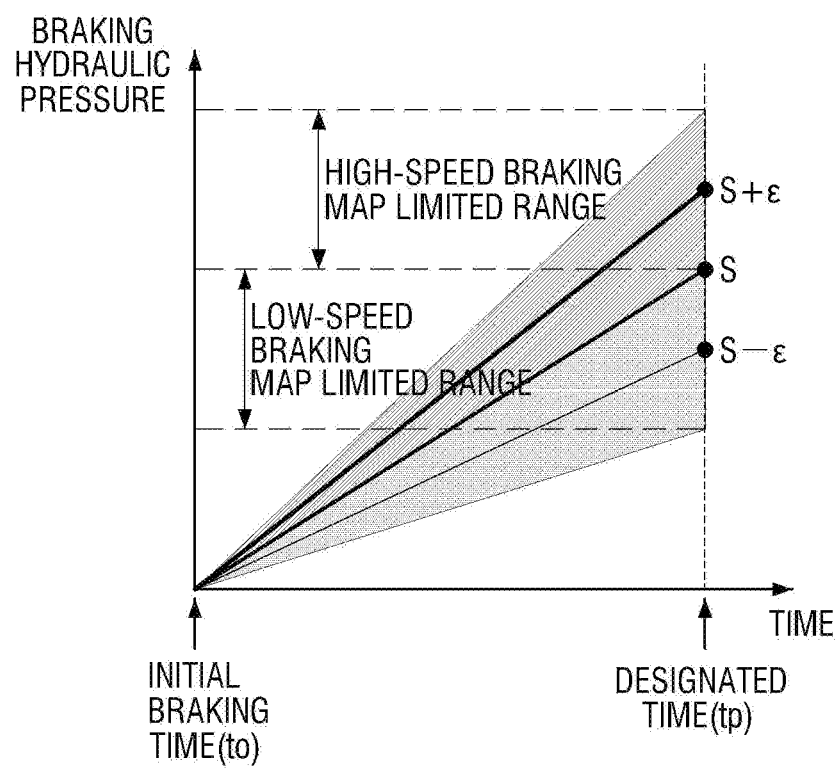
FIG. 5 is a diagram illustrating the second braking map where the low-speed braking slope and the high-speed braking slope are set in conjunction with the first braking map of FIG. 3.

FIG. 4 is a diagram illustrating a second braking map where a low-speed braking slope and a high-speed braking slope are selected in conjunction with the first braking map of FIG. 2. FIG. 5 is a diagram illustrating the second braking map where the low-speed braking slope and the high-speed braking slope are set in conjunction with the first braking map of FIG. 3.

Referring to FIG. 4, the braking map shown in the second selection unit 430 shows the medium-speed braking slope selected by the first selection unit 420, and shows the low speed section or the high speed section that are the remaining speed sections other than the medium speed section to which the medium-speed braking slope belongs. A driver designates the end point in the low speed section shown in the braking map as "L" or designates the end point in the high speed section as "H", so that the second braking map having the low-speed braking slope or the high-speed braking slope is generated.

If the reference braking slope is set in the first selection unit 420, the braking control unit 300 sets the braking slope in the low speed section or the high speed section by decreasing or increasing by a preset reference correction amount "ε" from the reference braking slope. To be more specific, in the second selection unit 430, the braking control unit 300 corrects the end point of the low speed section to S−ε to set the low-speed braking slope, and corrects the end point of the high speed section to S+ε to set the high-speed braking slope. FIG. 5 illustrates the second braking map having the corrected low-speed braking slope or high-speed braking slope.

Meanwhile, there may be a case where the braking slope of at least one of the remaining speed sections is not selected in the second selection unit 430. At this time, the braking control unit 300 corrects and sets the braking slope of the speed section that is not selected in the second selection unit 430. Here, a correction value may be a preset reference correction amount "ε". For example, if the medium-speed braking slope is selected in the first selection unit 420, the braking slope of the low speed section is a braking slope that is reduced by the reference correction amount "ε" from the medium-speed braking slope, and the braking slope of the high speed section is a braking slope that is increased by the reference correction amount "ε" from the medium-speed braking slope.

The first braking map is linked with the second braking map. Thus, the second braking map shows all of the low-speed braking slope, the medium-speed braking slope and the high-speed braking slope. Here, the low-speed to high-speed braking slopes are increased from the low speed to the high speed.

According to the form of the present disclosure, a driver may select the braking slope divided according to the initial braking speed section by the first selection unit 420 or the second selection unit 430. That is, according to the form of the present disclosure, a comfortable braking sense may be selected through a gentle and comfortable rise in hydraulic pressure at low speed, and a braking distance may be reduced through fast braking responsiveness at high speed.

Turning back to FIG. 1, the braking-pressure generating unit 500 generates braking hydraulic pressure in response to the braking-hydraulic-pressure signal of the braking control unit 300, and transmits the braking hydraulic pressure to each wheel of the vehicle.

The variable type flex brake system according to the form of the present disclosure is to change a braking sense by providing a different rise rate of hydraulic pressure according to the braking map generated for each initial braking speed, while keeping the specification of components of the existing brake system identical.

Meanwhile, even when the initial braking speed section is in the low speed section, a large braking force may be required at a time when a school zone, a narrow alley or the like appear. Even when the initial braking speed section is in the high speed section, a small braking force may be required at a time when a traffic volume is little or a passenger in the vehicle does not want a sudden braking sense. Therefore, the variable type flex brake system according to the form of the present disclosure has the active flex brake mode.

If the active flex brake mode is selected in the flex-brake-mode selection unit 410, the driving control unit 200 receives information about a change in driving situation through the information collecting unit 100 in real time, and applies a specificity determination signal to the braking control unit 300 if the change in driving situation is sensed.

Unless the driving vehicle receives information about a change in driving situation, the braking operation is performed according to the above-described second braking map. In contrast, if the driving vehicle receives information about a change in driving situation, the braking control unit 300 corrects the braking slope shown in the second braking map from a time when specificity occurs, in response to the specificity determination signal.

Figure 6:
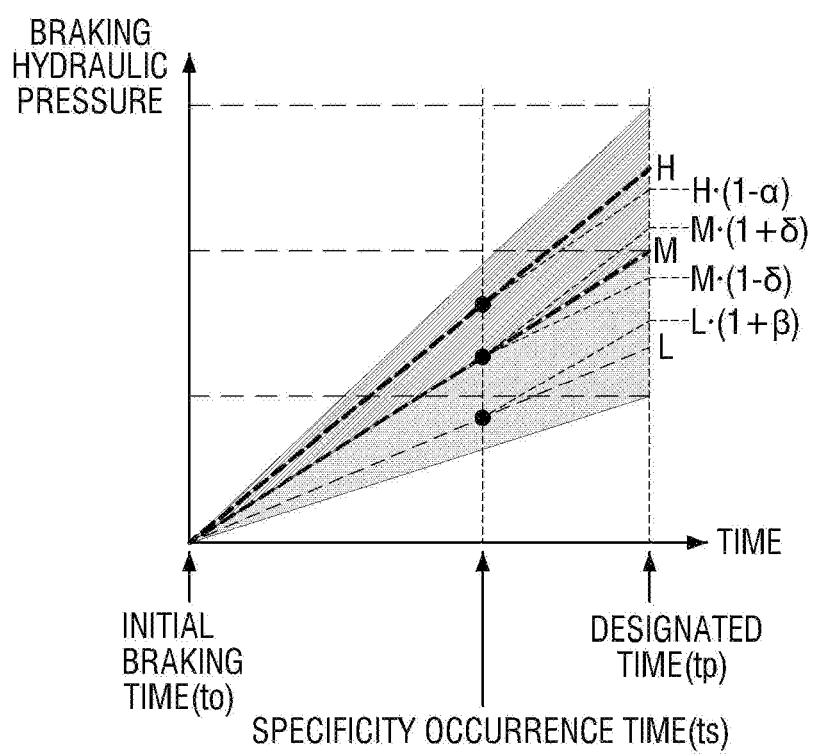
FIG. 6 is a diagram illustrating the second braking map where a braking slope is changed at a time when specificity occurs in conjunction with the second braking map of FIG. 4 in an active flex brake system according to one form of the present disclosure.
Figure 7:
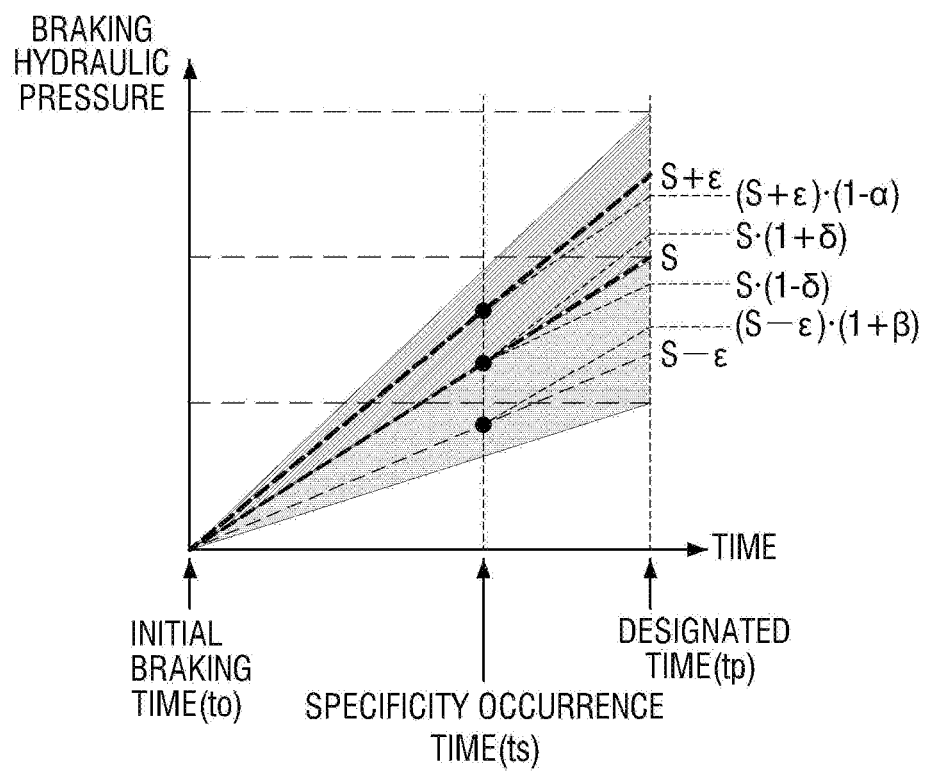
FIG. 7 is a diagram illustrating the second braking map where a braking slope is changed at a time when specificity occurs in conjunction with the second braking map of FIG. 5 in the active flex brake system according to one form of the present disclosure.

FIG. 6 is a diagram illustrating the second braking map where the braking slope is changed at a time when specificity occurs in conjunction with the second braking map of FIG. 4 in the active flex brake system according to one form of the present disclosure, and FIG. 7 is a diagram illustrating the second braking map where the braking slope is changed at a time when specificity occurs in conjunction with the second braking map of FIG. 5 in the active flex brake system according to one form of the present disclosure.

Referring to FIG. 6, it can be seen that a driver selects all the low-speed to high-speed braking slopes. Here, in a time is when specificity occurs, the braking control unit 300 corrects at least one of the low-speed to high-speed braking slopes.

To be more specific, in the medium speed section, the braking control unit 300 reduces or increases the end point of the medium-speed braking slope of the second braking map by a preset medium-speed correction amount "δ". Referring to FIG. 6, the end point of the medium-speed braking slope is changed into M(1−δ) or M(1+δ). Here, the maximum value of the corrected medium-speed braking slope is the high-speed braking slope of the second braking map, and the minimum value of the corrected medium-speed braking slope is the low-speed braking slope of the second braking map.

Furthermore, in the high speed section, the braking control unit 300 reduces or increases the end point of the high-speed braking slope of the second braking map by the preset high-speed correction amount "α". Referring to FIG. 6, the end point of the high-speed braking slope is changed into H(1−α). However, the end point of the corrected high-speed braking slope may be increased. Here, the minimum value of the corrected high-speed braking slope is the medium-speed braking slope of the second braking map, and the maximum value of the corrected high-speed braking slope is the upper limit of the high-speed section shown in the second braking map.

Furthermore, in the low speed section, the braking control unit 300 reduces or increases the end point of the low-speed braking slope of the second braking map by a preset low-speed correction amount "β". Referring to FIG. 6, the end point of the low-speed braking slope is changed into L(1+β). However, the corrected low-speed braking slope may be reduced. Here, the maximum value of the corrected low-speed braking slope is the medium-speed braking slope of the second braking map, and the minimum value of the corrected low-speed braking slope is the lower limit of the low-speed section shown in the second braking map.

Referring to FIG. 7, it can be seen that a driver does not select all the low-speed to high-speed braking slopes. Here, in a time is when specificity occurs, the braking control unit 300 corrects at least one of the low-speed to high-speed braking slopes.

In this regard, the correction amount and the correction range are equal to the correction amount and the correction range described with reference to FIG. 6. However, the end point of the medium-speed braking slope is denoted by S, the end point of the high-speed braking slope is denoted by S+ε, and the end point of the low-speed braking slope is denoted by S−ε. Therefore, the braking slope corrected by applying the correction amount and the correction range to the above-described end point can be fully understood through the description of the present disclosure.

Meanwhile, as described above, if the braking slope is not selected in the second selection unit, the second braking map has the corrected braking slope in the unselected speed section. In this state, at a time when specificity occurs, the braking slope is changed according to the above-described correction amount and correction range. Therefore, various end points of the braking slope that are not illustrated in FIGS. 6 and 7 may be set.

Figure 8:
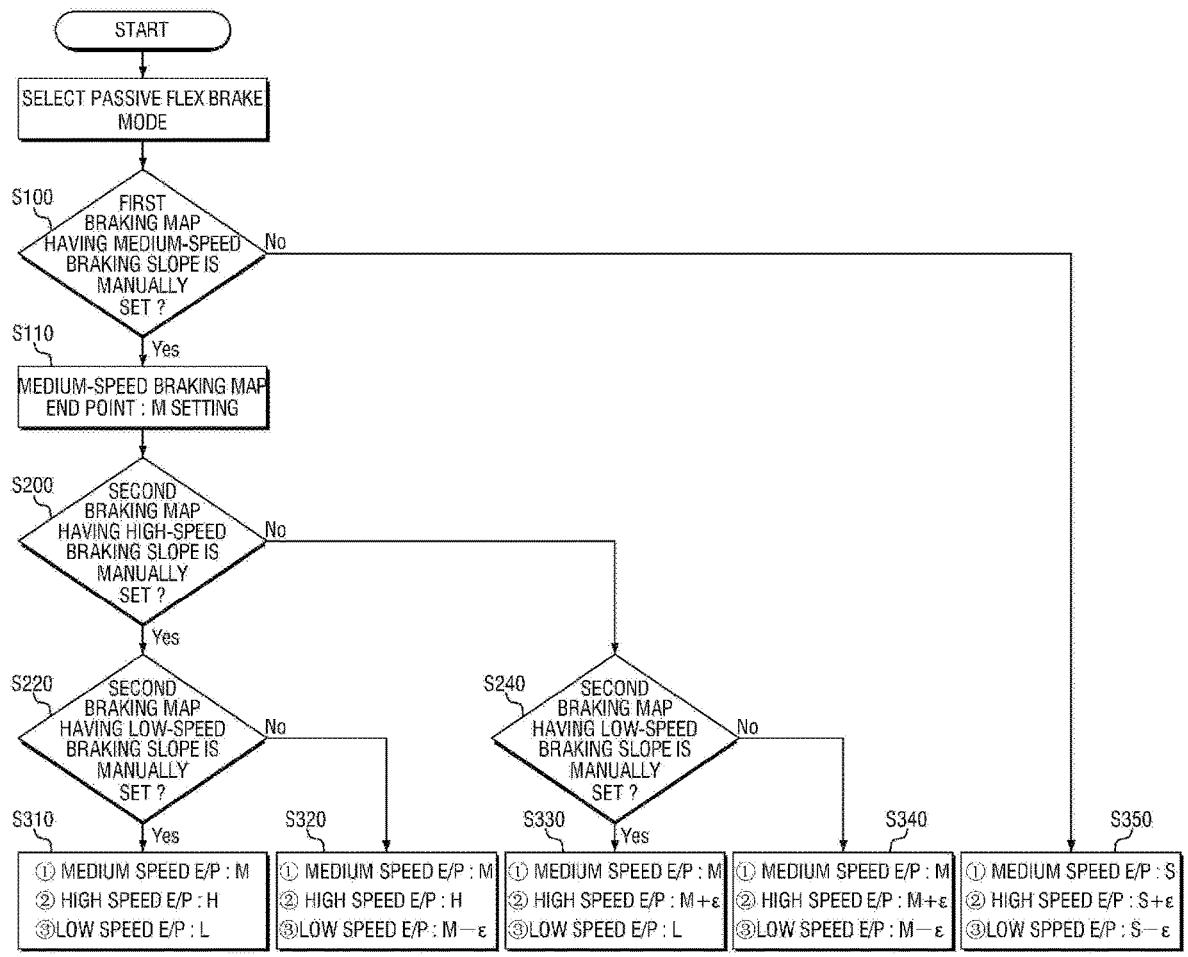
FIG. 8 is a flowchart illustrating the operating process of a passive flex brake system according to one form of the present disclosure.

FIG. 8 is a flowchart illustrating the operating process of the passive flex brake system according to one form of the present disclosure.

Referring to FIG. 8, if a driver selects the medium-speed braking slope at step S100, the end point of the medium-speed braking slope shown in the first braking map is M at step S110.

Subsequently, if the driver selects the high-speed braking slope and the low-speed braking slope at steps S200 and S220, the end points of the low-speed to high-speed braking slopes shown in the second braking map are L, M and H at step S310.

Further, if the driver selects the high-speed braking slope but does not select the low-speed braking slope at steps S200 and S220, the end points of the low-speed to high-speed braking slopes shown in the second braking map are M−ε, M and H at step S320. Here, the low-speed braking slope is corrected on the basis of the medium-speed braking slope.

Furthermore, if the driver selects the low-speed braking slope but does not select the high-speed braking slope at steps S200 and S240, the end points of the low-speed to high-speed braking slopes shown in the second braking map are L, M, and M+ε at step S330. Here, the high-speed braking slope is corrected on the basis of the medium-speed braking slope.

In addition, if the driver does not select the low-speed and high-speed braking slopes at steps S200 and S240, the end points of the low-speed to high-speed braking slopes shown in the second braking map are M−ε, M, and M+ε at step S340. Here, the low-speed and high-speed braking slopes are corrected on the basis of the medium-speed braking slope.

Meanwhile, if the driver does not select the medium-speed braking slope at step S100, the end points of the low-speed to high-speed braking slopes shown in the second braking map are S−ε, S, and S+ε at step S350. Here, the low-speed and high-speed braking slopes are corrected on the basis of the reference braking slope.

Figure 9:
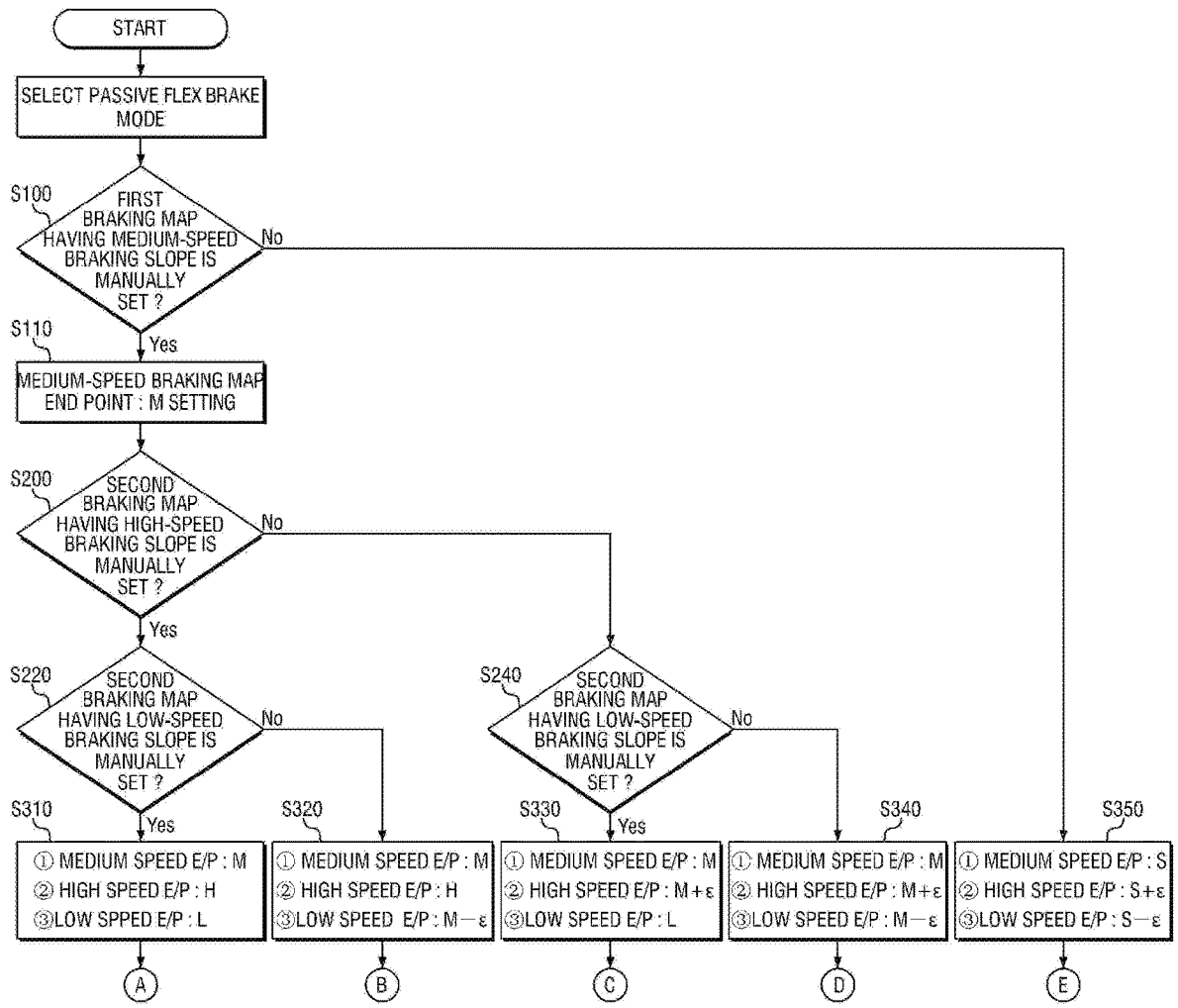
FIG. 9 is a flowchart illustrating the operating process of an active flex brake system according to one form of the present disclosure.
Figure 10:
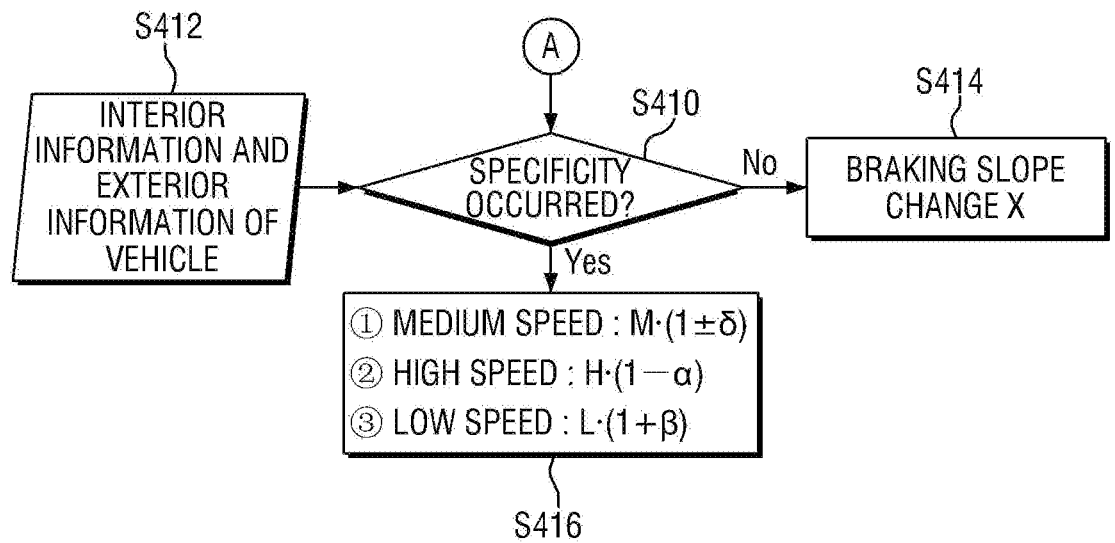
FIG. 10 is a flowchart illustrating a process connected with a connecting letter A of FIG. 9 and correcting a braking slope depending on whether specificity occurs or not.
Figure 11:
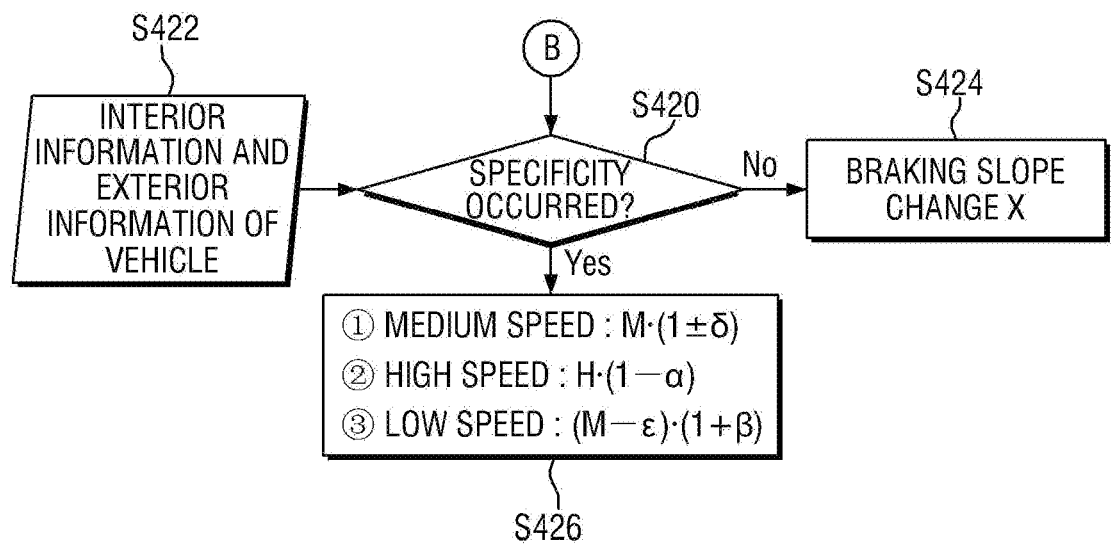
FIG. 11 is a flowchart illustrating a process connected with a connecting letter B of FIG. 9 and correcting a braking slope depending on whether specificity occurs or not.
Figure 12:
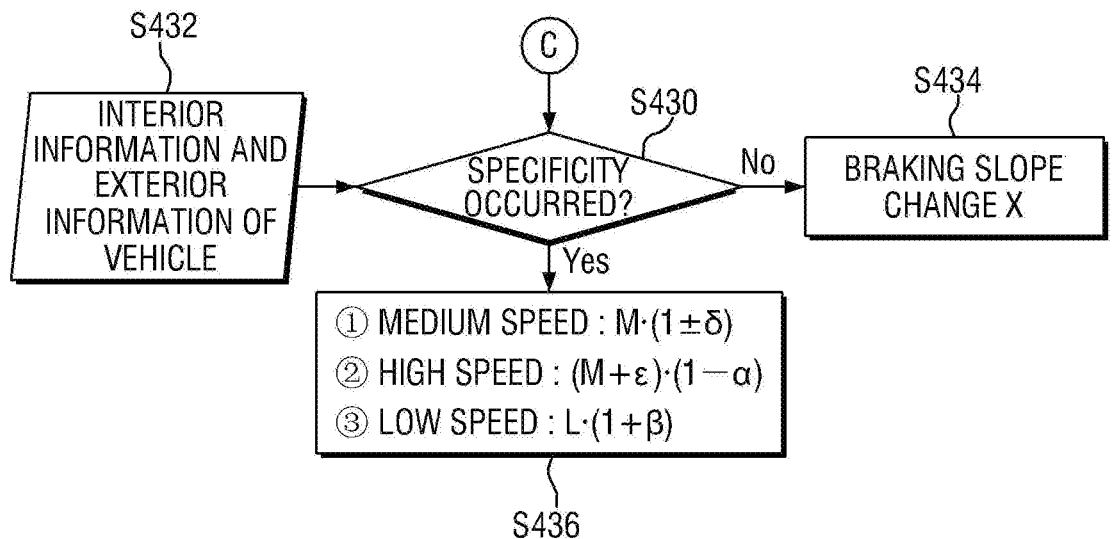
FIG. 12 is a flowchart illustrating a process connected with a connecting letter C of FIG. 9 and correcting a braking slope depending on whether specificity occurs or not.
Figure 13:
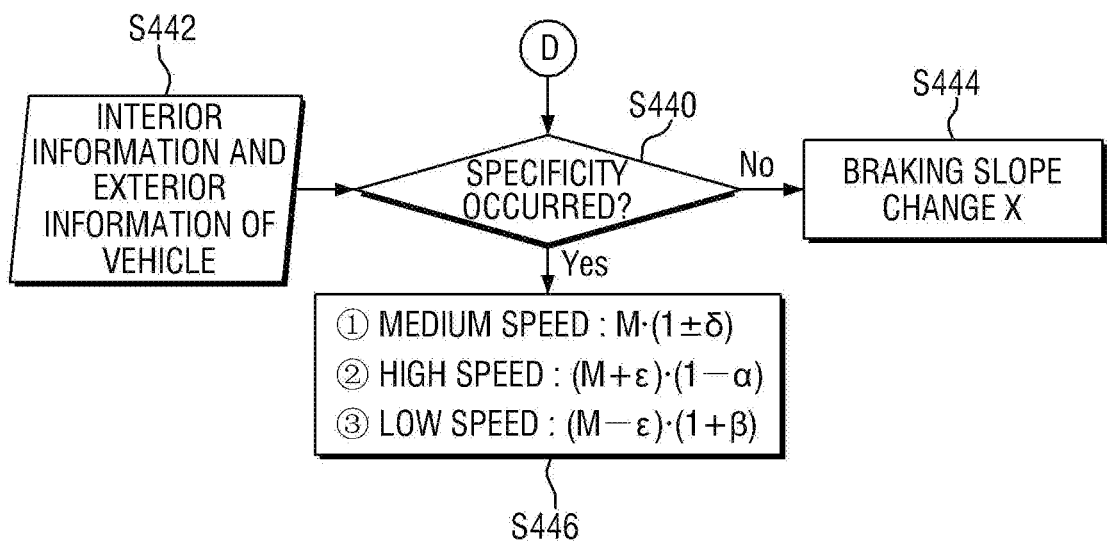
FIG. 13 is a flowchart illustrating a process connected with a connecting letter D of FIG. 9 and correcting a braking slope depending on whether specificity occurs or not.
Figure 14:
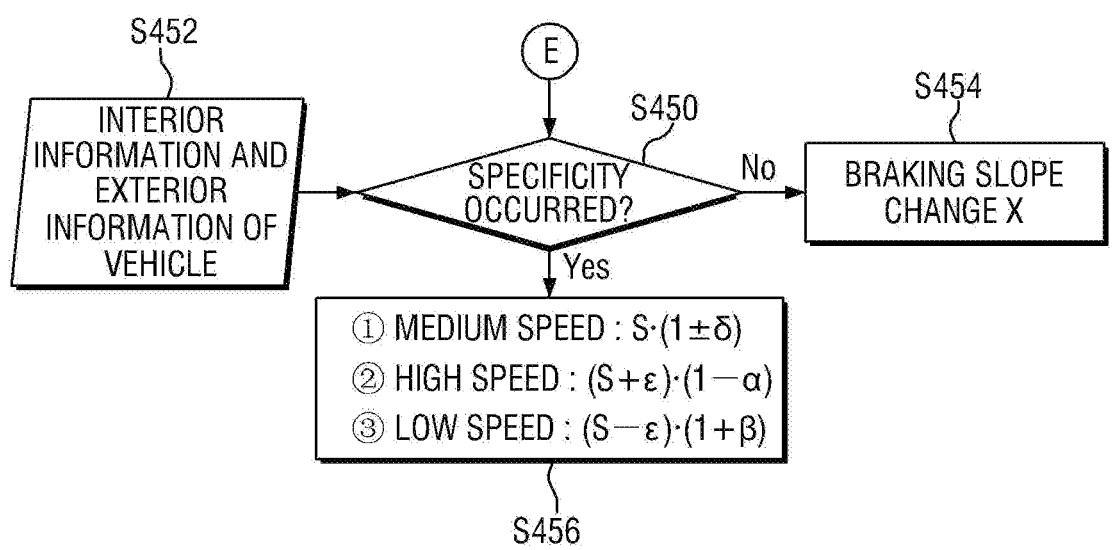
FIG. 14 is a flowchart illustrating a process connected with a connecting letter E of FIG. 9 and correcting a braking slope depending on whether specificity occurs or not.

FIG. 9 is a flowchart illustrating the operating process of an active flex brake system according to one form of the present disclosure, and FIGS. 10 to 14 are flowcharts illustrating processes connected with connecting letters A to E of FIG. 9 and correcting the braking slope depending on whether specificity occurs or not.

As shown in FIG. 9, the process of generating the first braking map and the second braking map in the active flex brake mode is equal to that in the passive flex brake mode, but is different from that in the passive flex brake mode in a step of determining whether specificity occurs during driving.

Referring to FIGS. 10 to 14, the braking control unit 300 receives the interior and exterior information of the vehicle from the driving control unit 200 in real time at steps S412, S422, S432, S442, and S452, and determines whether specificity occurs or not at steps S410, S420, S430, S440, and S450. Unless the specificity occurs, the braking slope shown in the second braking map is not changed at steps S414, S424, S434, S444, and S454. If the specificity occurs, the braking slope shown in the second braking map is corrected. Here, the end points of the corrected braking slope may be obtained by performing calculation between the end points shown in the second braking map at the connecting letters A to E and the low-speed correction amount β, the medium-speed correction amount δ, and the high-speed correction amount α at steps S416, S426, S436, S446, and S456.

Although the present disclosure was described with reference to specific forms shown in the drawings, it is apparent to those skilled in the art that the present disclosure may be changed and modified in various ways without departing from the scope of the present disclosure.

What is claimed is:

1. A variable type flex brake system comprising:
   a driving control unit configured to:
   receive interior information or exterior information of a vehicle,
   provide an autonomous driving control mode and a normal driving control mode,
   calculate a required braking force required for the vehicle in the autonomous driving control mode and the normal driving control mode, and
   generate a required braking force signal corresponding to the required braking force;
   a first selection unit configured to select a braking slope corresponding to a speed belonging to any one of a low-speed section, a medium-speed section, and a high-speed section, which are speed sections divided based on an initial braking speed of the vehicle, and configured to generate a first braking map;
   a second selection unit configured to select a braking slope corresponding to a speed belonging to remaining speed sections, among the low-speed section, the medium-speed section and the high-speed section, that are not selected by the first selection unit, and configured to generate a second braking map; and
   a braking control unit configured to generate a braking-hydraulic-pressure signal based on the first braking map or the second braking map in response to the required braking force signal.

2. The variable type flex brake system of claim 1, wherein the required braking force signal in the autonomous driving control mode is a required deceleration signal of the driving control unit, and the required braking force signal in the normal driving control mode is a pedal effort signal received from a pedal stroke sensor.

3. The variable type flex brake system of claim 1, wherein, unless the braking slope is selected in the first selection unit, the first braking map has a reference braking slope corresponding to a preset speed of the medium-speed section.

4. The variable type flex brake system of claim 3, wherein, in the second braking map, the braking slope of the low-speed section is reduced by a preset reference correction amount (ε) from the reference braking slope, and the braking slope of the high-speed section is increased by a preset reference correction amount (ε) from the reference braking slope.

5. The variable type flex brake system of claim 1, wherein a speed section having a limited range of braking hydraulic pressure is shown in the first selection unit or the second selection unit.

6. The variable type flex brake system of claim 1, wherein the braking slope is set by designating an end point corresponding to a braking hydraulic pressure at a preset designated time in the first braking map or the second braking map.

7. The variable type flex brake system of claim 1, wherein, among the low-speed section, the medium-speed section and the high-speed section, unless the braking slope of the remaining speed sections is selected in the second selection unit, the braking slope of the remaining speed sections is reduced or increased by a preset reference correction amount (ε) from the braking slope selected in the first selection unit.

8. The variable type flex brake system of claim 1, wherein the driving control unit is configured to generate a specificity determination signal that is information about a change in driving situation of the vehicle, based on the interior information or the exterior information of the vehicle, and the braking control unit is configured to change the braking slope of the second braking map from a time when specificity occurs, in response to the specificity determination signal.

9. The variable type flex brake system of claim 8, wherein a medium-speed braking slope of the second braking map is reduced or increased by a preset medium-speed correction amount (δ) from the time when the specificity occurs.

10. The variable type flex brake system of claim 9, wherein a maximum value of the medium-speed braking slope changed from the time when the specificity occurs is a high-speed braking slope selected in the first selection unit or the second selection unit, and a minimum value of the medium-speed braking slope changed from the time when the specificity occurs is a low-speed braking slope selected in the first selection unit or the second selection unit.

11. The variable type flex brake system of claim 8, wherein a high-speed braking slope of the second braking map is reduced or increased by a preset high-speed correction amount (α) from the time when the specificity occurs.

12. The variable type flex brake system of claim 11, wherein a minimum value of the high-speed braking slope changed from the time when the specificity occurs is a medium-speed braking slope selected in the first selection unit or the second selection unit.

13. The variable type flex brake system of claim 8, wherein a low-speed braking slope of the second braking map is reduced or increased by a preset low-speed correction amount (β) from the time when the specificity occurs.

14. The variable type flex brake system of claim 13, wherein a maximum value of the low-speed braking slope changed from the time when the specificity occurs is a medium-speed braking slope selected in the first selection unit or the second selection unit.

* * * * *